United States Patent
Shae et al.

(10) Patent No.: US 7,987,275 B2
(45) Date of Patent: Jul. 26, 2011

(54) METHOD, APPARATUS AND COMPUTER PROGRAM PRODUCT IMPLEMENTING A CHAT APPLICATION PROXY AND A CHAT APPLICATION WRAPPER IN A CHAT SYSTEM

(75) Inventors: Zon-Yin Shae, South Salem, NY (US); Gopal Sarma Pingali, Mohegan Lake, NY (US); David D. Weck, Lexington, KY (US)

(73) Assignee: International Business Machines Corporation, Armonk, NY (US)

(*) Notice: Subject to any disclaimer, the term of this patent is extended or adjusted under 35 U.S.C. 154(b) by 309 days.

(21) Appl. No.: 11/856,859

(22) Filed: Sep. 18, 2007

(65) Prior Publication Data
US 2009/0077176 A1    Mar. 19, 2009

(51) Int. Cl.
G06F 15/16 (2006.01)
G06F 3/00 (2006.01)

(52) U.S. Cl. .................. 709/227; 709/228; 715/753

(58) Field of Classification Search .......... 709/205, 709/206, 207, 227–228; 715/758, 751, 753; 370/260, 352–356
See application file for complete search history.

(56) References Cited

U.S. PATENT DOCUMENTS

| | | | |
|---|---|---|---|
| 7,028,051 B1 * | 4/2006 | McMullan et al. | 1/1 |
| 7,131,003 B2 * | 10/2006 | Lord et al. | 713/168 |
| 7,165,093 B2 * | 1/2007 | Smith et al. | 709/206 |
| 7,200,634 B2 * | 4/2007 | Mendiola et al. | 709/204 |
| 7,299,259 B2 * | 11/2007 | Petrovykh | 709/205 |
| 2003/0105820 A1 * | 6/2003 | Haims et al. | 709/205 |
| 2003/0187925 A1 * | 10/2003 | Inala et al. | 709/204 |
| 2004/0068567 A1 * | 4/2004 | Moran et al. | 709/227 |
| 2007/0143103 A1 * | 6/2007 | Asthana et al. | 704/200 |
| 2007/0162545 A1 * | 7/2007 | Liu et al. | 709/204 |
| 2007/0218924 A1 * | 9/2007 | Burman et al. | 455/466 |
| 2008/0083010 A1 * | 4/2008 | Koehler et al. | 726/1 |
| 2008/0086754 A1 * | 4/2008 | Chen et al. | 725/105 |
| 2009/0077180 A1 * | 3/2009 | Flowers et al. | 709/206 |

OTHER PUBLICATIONS

Stone, A., Internationalizing the Internet, May-Jun. 2003, Internet Computer, IEEE, vol. 7, Issue 3, pp. 11-12.*

* cited by examiner

*Primary Examiner* — Nathan Flynn
*Assistant Examiner* — Joel Hamel
(74) *Attorney, Agent, or Firm* — Harrington & Smith

(57) ABSTRACT

Methods, apparatus and computer program products implement a chat proxy component and a chat wrapper component. The chat proxy component controls interactions with a chat application by external users. The chat proxy component receives chat requests from external users and initiates a chat session only if a user is validated as a valid user. User validation may be performed by a chat payment application that validates a user only if payment is received for chat services, or by an external user validation system that validates users as, for example, employees authorized to use the chat application. Once a chat session is established, chat operations are managed on a session-specific basis. The chat wrapper component manages communication between the chat proxy component and the chat application. The chat wrapper component also permits the user-facing chat application to be situated on a remote computer.

18 Claims, 5 Drawing Sheets

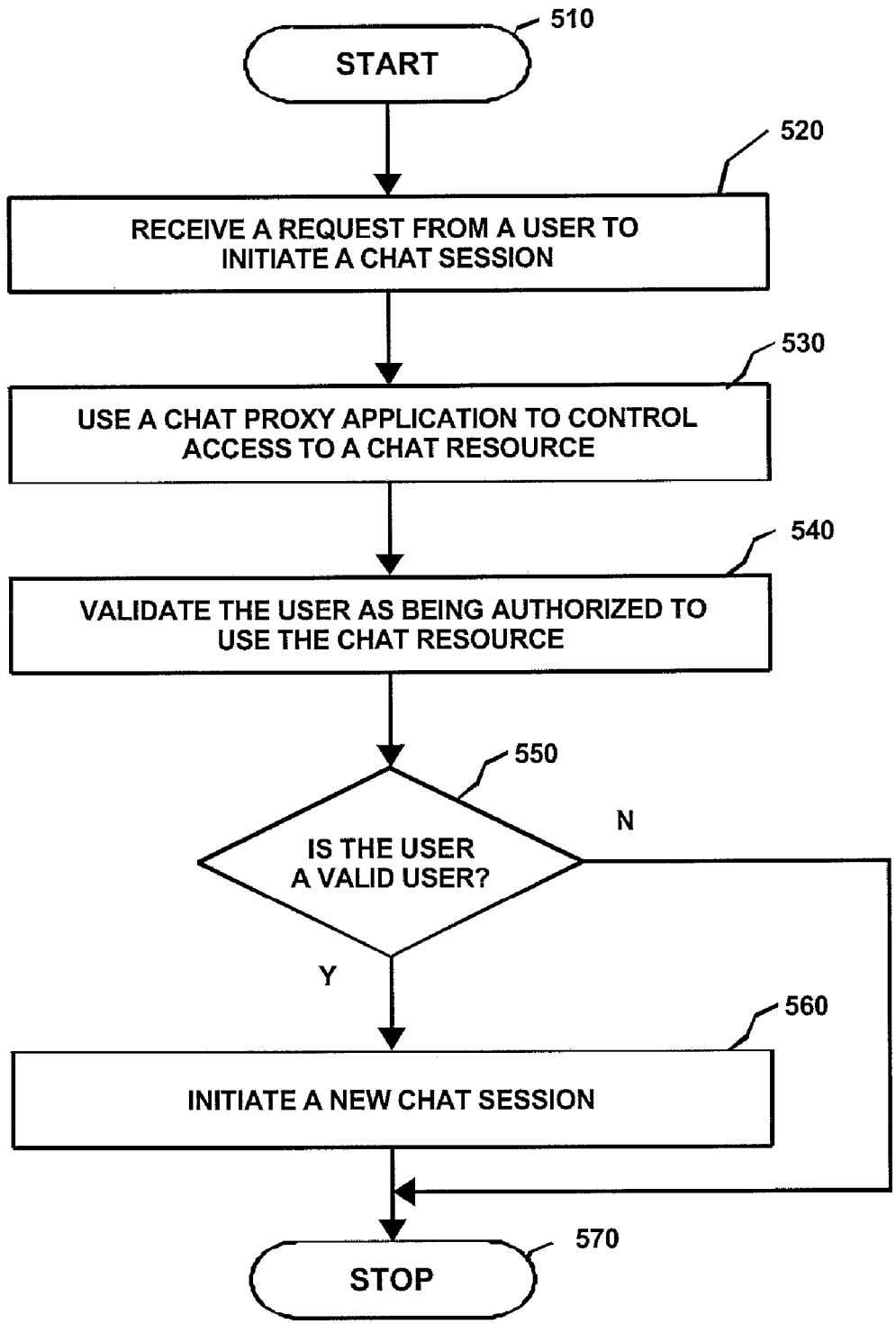

METHOD, APPARATUS AND COMPUTER PROGRAM PRODUCT IMPLEMENTING A CHAT APPLICATION PROXY AND A CHAT APPLICATION WRAPPER IN A CHAT SYSTEM

TECHNICAL FIELD

The invention generally concerns chat applications and more particularly concerns methods, apparatus and computer program products for implementing a chat proxy to control access and interactions by external users with a chat application, and for implementing a chat wrapper to manage interactions between the chat proxy and the chat application.

BACKGROUND

There are two types of chat models. The first type is a peer-to-peer chat model (such as, for example, IBM Same-Time). Chat applications operating in accordance with this model have a peer "Presence" information display that a user clicks to chat. The second type is a help desk services chat model. In the second type of chat model there is no peer presence information available; the user just clicks a button asking for help and the chat system automatically routes the request to an available chat agent.

Chat has become increasingly important as an effective means for contacting a help desk. Cultural shifts and increased use of text messaging and instant messaging have resulted in using these methods to contact a help desk agent. The current model of help desk chat is a charge-free model, such that everyone is allowed to access a chat resource to contact a help desk agent. It is the responsibility of the help desk agent to verify and filter the legality of the user. This negatively impacts help desk agent productivity and increases the cost of providing help desk services.

It has also been found that the average help desk agent can handle only 1 voice call at a time, but can handle 2-5 chat sessions simultaneously. Accordingly, the savings associated with providing chat as an alternate method for contacting a help desk can be significant.

Existing help desk chat products consist of three components: (1) a routing engine; (2) an agent application/graphical user interface; and (3) an API for a customized user facing application/graphical user interface. Conventional chat systems configured accordance with the prior art have several drawbacks. These drawbacks will be discussed in the following paragraphs.

Conventional chat systems do not provide a secure and scalable model to validate a chat session. Certain voice call help desk implementations require a user to key in a password before the call can reach an agent. However, such voice call user verification mechanisms cannot be applied effectively to chat systems. Voice call system user verification is a "once only" check. The voice system answers the user's call and verifies the user's password, and then redirects the call to the agent, after that the verification system is "out of the loop". This method works only for voice systems since there is no other way for a user to access the help desk resource (agent). This method does not work for chat system service since the chat system comprises an internet resource and resources associated with the chat system (such as, for example, chat routing infrastructure and agents) can be accessed by URL. Such accessibility creates significant security issues.

Some existing chat products do provide a local database internally for user authentication. This approach is not scalable since enterprise users have their own LDAP for user authentication. It would require a large effort for the service provider to duplicate and synchronize the LDAP to the local database for each enterprise customer.

Conventional chat systems also require that user facing chat applications be implemented and run in the same machines as the existing chat product. This imposes a very severe limitation since the owner of the chat resource and chat applications may be different. Conventional architectures of chat systems do not support installation of a firewall that would prevent users from directly accessing the chat resource.

Conventional chat systems also require language-specific infrastructure to support various languages. In chat systems operating in accordance with the prior art a language-specific system is implemented to support a single language. This language-specific system can be a language-specific API component for chat applications to use. It is very expensive for a service provider to implement a universal chat service that supports all the languages in the world.

Conventional chat systems only support text chat. Conventional chat systems do not support multimedia. There are technical difficulties in supporting multimedia chat due to conflicting critical requirements specific to providing a chat service tool for a help desk. One critical requirement is that the tool needs to provide an API for service providers to write their own user facing chat application. The user facing chat application must also provide a path for service providers to integrate the chat application with external enterprise applications. This "customized" user facing chat application requirement results in the user facing and the agent facing applications not being able to talk to each other directly. These two components need to communicate with each other via a transport pipe of the existing chat product. Since there is no standard way to transport multimedia content in chat, the existing products cannot support multimedia chat for help desk services.

Conventional chat systems do not automatically integrate with ticketing systems. It is an important requirement that there be a ticket created for each chat contact of the help desk. Usually, the ticket is created manually by the agents performing the service. The agent will fill in the context of the conversation in the ticket after the session. This is time-consuming and negatively impacts the productivity of the chat agent.

Conventional chat systems do not support embedded commands. Once a chat session has been established, communication between user and agent is only of the chat content, no embedded commands are allowed.

Accordingly, those skilled in the art seek improved chat systems that overcome each of the foregoing limitations and drawbacks of the prior art.

SUMMARY OF THE INVENTION

A first embodiment of the invention is a system comprising a chat application proxy component configured to control access to an external chat application; and a chat application wrapper component configured to manage communication between the chat application proxy component and the external chat application.

A second embodiment of the invention is a computer program product comprising a computer-readable memory medium tangibly embodying a computer program, the computer program, when executed by digital processing apparatus, configured establish a chat proxy component to perform operations to control access to an external chat application and to establish a chat wrapper component to perform operations to manage communication between the chat proxy component and the external chat application.

A third embodiment of the invention is a method comprising: receiving a request from a user to initiate a chat session; using a chat proxy application to control access to a chat resource; validating the user as being authorized to use the chat resource with an external user validation system; communicating an outcome of the user validation operation to the chat proxy application; and initiating a chat session with the chat proxy application only if the user is validated as a valid user of the chat resource.

In conclusion, the foregoing summary of the various embodiments of the present invention is exemplary and non-limiting. For example, one or ordinary skill in the art will understand that one or more aspects or steps from one embodiment can be combined with one or more aspects or steps from another embodiment to create a new embodiment within the scope of the present invention.

BRIEF DESCRIPTION OF THE DRAWINGS

The foregoing and other aspects of these teachings are made more evident in the following Detailed Description of the Invention, when read in conjunction with the attached Drawing Figures, wherein:

FIG. 5 is a flow chat depicting a method operating in accordance with the invention.

DETAILED DESCRIPTION OF THE INVENTION

Figure 1:
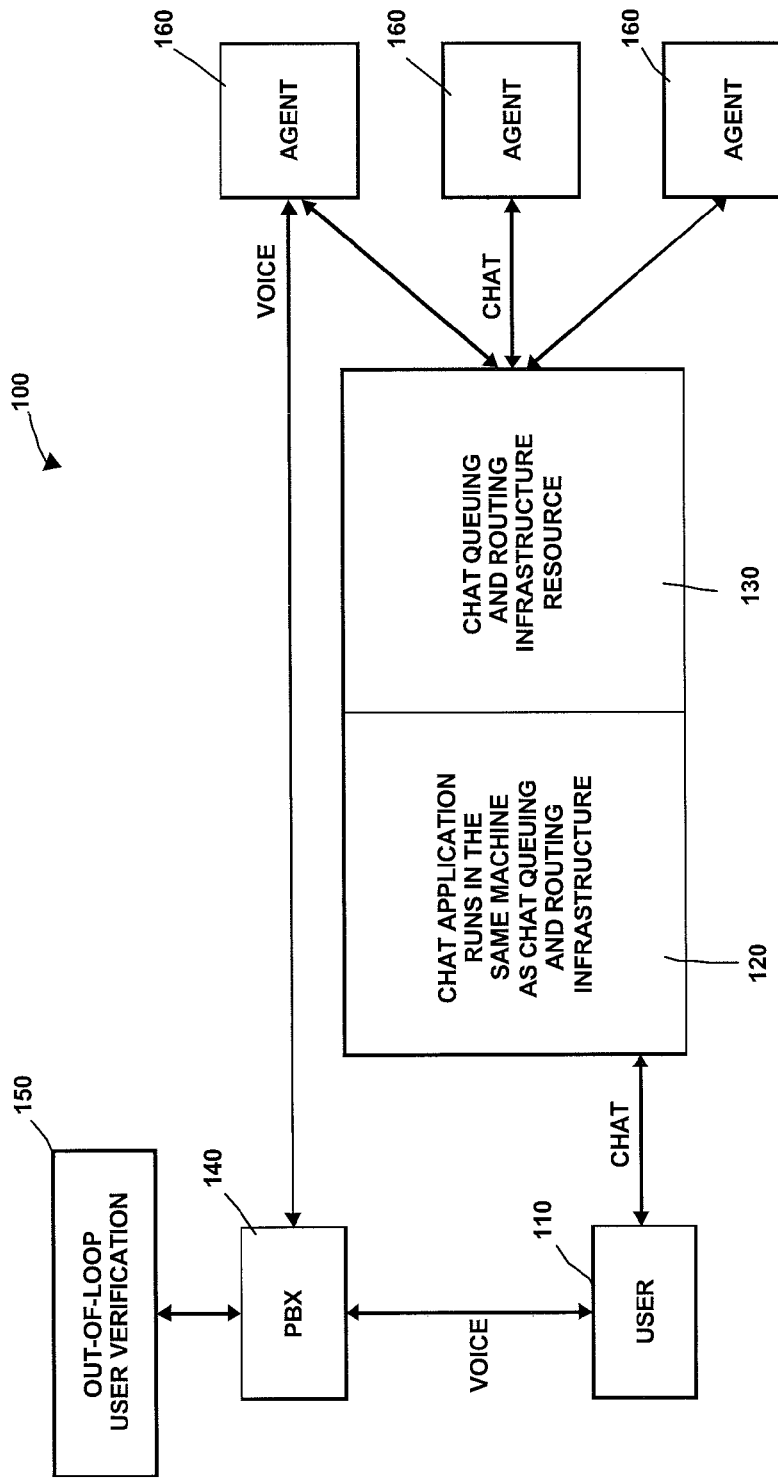
FIG. 1 is a block diagram depicting a chat system configured in accordance with the prior art.

Methods, apparatus and computer program products of the invention implement a chat application proxy system that provides secure and scalable access to a chat resource (e.g., a help desk). A system operating in accordance with the invention protects the chat resource by managing chat operations on a session basis. This is accomplished by permitting access to the chat resource only if a session request credential is externally validated. Note that this validation validates a session request but does not validate the user. User validation occurs prior to session creation. Only if a user is properly validated will a session be created. Once a session is created, though, operations (including access to and interactions with the chat resource) are managed with respect to the chat session. A session validation component configured in accordance with the invention can integrate and cooperate with existing LDAP systems. The prior art problem of LDAP synchronization across various customers is therefore removed. Chat traffic in embodiments of the invention traverses the chat proxy component before accessing the back end chat resource (infrastructure and agent). Moreover, chat proxy components operating in accordance with the invention provide an extension to the user facing chat application so that the user facing chat application can run remotely in the chat proxy component. This removes the limitation of the "local" chat application accessed by the user being implemented in the same machine as the chat application with its attendant security risks.

Embodiments operating in accordance with the invention also separate a "routing path" from a "media path" to achieve multi-languages and multimedia support. The invention can integrate and reuse the routing engine of a chat application product for the "routing path" to route a chat request to an agent. A media path, when implemented in embodiments of the invention, is managed separately by the chat proxy to provide a direct media connection between agents and users. The media path provides multi-language and multimedia support even when a pre-existing chat application provides neither multi-language nor multi-media support. Multi-language support can be achieved at very low cost by using the "routing path" for only one language (for example, English), and the media path for multiple languages using Unicode encoding and transporting techniques. Multi-media support becomes possible in embodiments of the invention since the user facing application/graphical user interface and the agent facing application/graphical user interface belong to the same owner. Multimedia objects are defined within the system implemented by the chat application proxy component and are understood from end-to-end.

Further, the chat application proxy component of the invention is configured to identify, extract and execute embedded commands issued by users and agents. Embedded commands are very important for providing improved chat service. Embedded command extractors extract and execute commands. For example, the system can use this embedded command to integrate closely the remote take-over function of the user's computer for the agent.

Before proceeding with an in-depth description of the invention, a description of the prior art will be provided. FIG. 1 depicts a chat system operating in accordance with the prior art. In the chat system 100 depicted in FIG. 1, the user-facing chat application 120 runs in the same machine as the chat queuing and routing infrastructure resource 130. Agents 160 validate users 110 after a chat session has been established. In systems 100 that implement both chat- and voice-based help, users may be required to key in a password before a call can reach an agent. In a typical embodiment, voice and password are handled by PBX 140, and out-of-loop user verification 150 is performed. The out-of-loop user verification component used to validate voice calls cannot be easily applied to the chat system 120, 130. Chat resources are accessed using URLs, and can be accessed directly, bypassing the out-of-loop user verification component 150. Accordingly, an in-loop credential verification system is required for chat services. As is evident from the system depicted in FIG. 1, users have direct access to the machine implementing both the user-facing chat application and the chat queuing and routing infrastructure resource. For example, there is no firewall implemented between the user and the chat applications.

Figure 2:
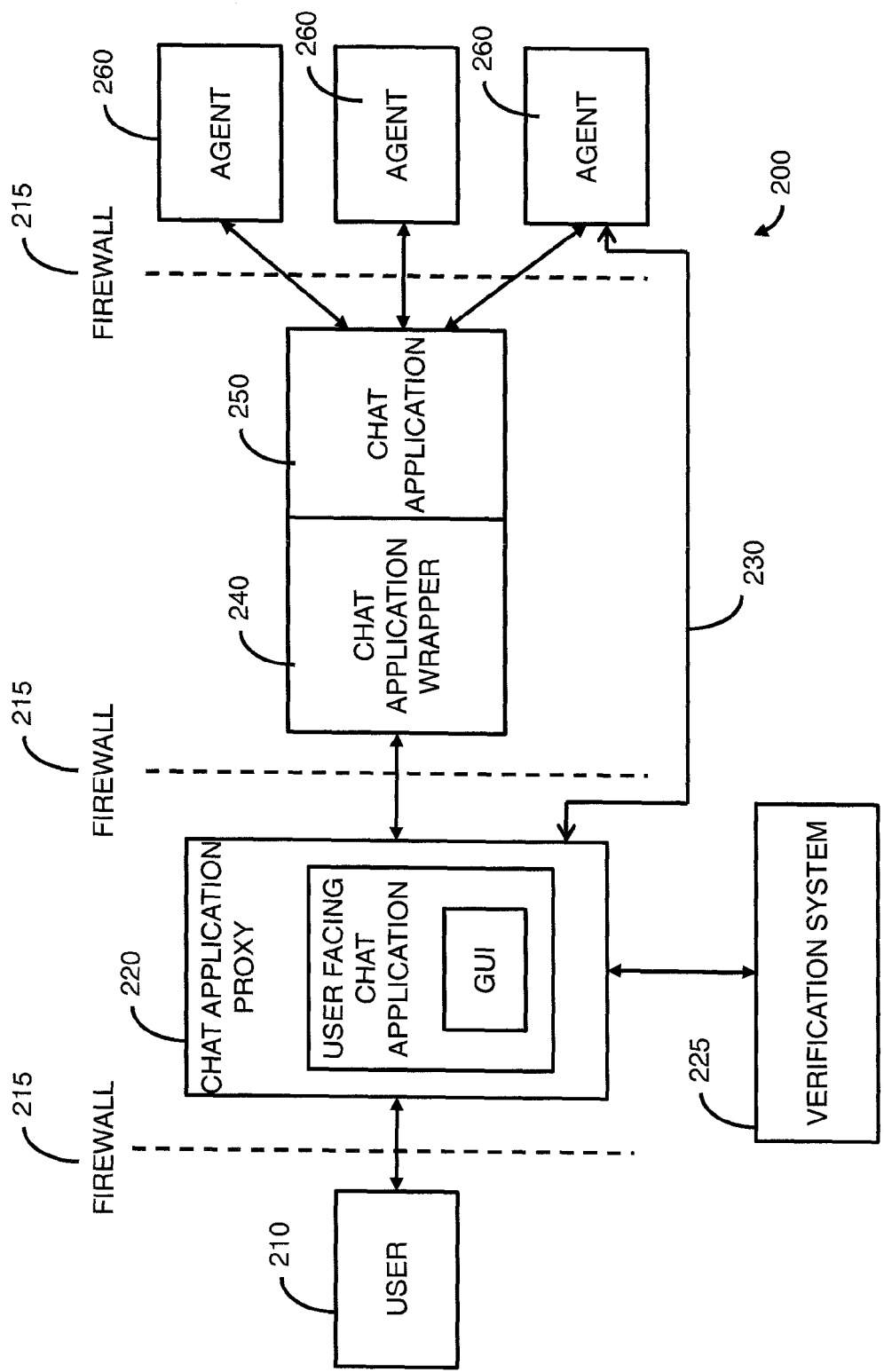
FIG. 2 is a block diagram depicting a chat system configured in accordance with the invention.

FIG. 2 is a block diagram depicting a chat system 200 configured in accordance with the invention. In the chat system 200 of the invention, a chat application proxy system 220 allows a paid model for chat services to be implemented with an existing third party chat application 250 that provides chat routing services, but does not provide a system for paying for chat services. An in-loop user verification subsystem 225 operates in combination with the chat application proxy system 220. The in-loop user verification subsystem 225 restricts access to the chat application 250 to authorized users.

The system 200 of the invention also implements a separate control (routing) path and media path 230 through the chat application proxy system 220. The routing path supports chat communications in a language native to the chat application 250. The chat application proxy system 220 of the invention implements media path 230 to support multimedia and multiple language chat operations in languages not supported by chat application 250.

In one embodiment configured in accordance with the invention a user facing chat application is implemented in the chat application proxy system. This remedies a limitation of conventional chat application systems that implement user facing chat applications in the same machine that runs chat queuing and routing operations.

Once a chat session is initiated, the chat application proxy system 220 manages chat operations on a session basis. In one advantage of this aspect of the invention a session can be reestablished even when a user is temporarily disconnected from the network. When reestablishing the temporarily disconnected session, the session is reestablished with the same agent.

In another advantage of the system made possible by the media path 230 implemented by the chat application proxy 220 operating in accordance with the invention, users can switch from chat to voice and from voice to chat, depending on user preferences. In a further advantage of the chat system 200 depicted in FIG. 2, the chat application proxy 220 is configured to receive and to act on embedded commands issued by agents and users. The embedded commands allow an agent, for example, to assume control of a user's computer during a chat session.

The chat system 200 of the invention depicted in FIG. 2 comprises at least two components: (a) a chat application proxy 220 (depicted in greater detail in FIG. 3) which provides a user facing application (comprising at least a graphical user interface, GUI) and in-loop protection of the internal chat resource and (b) a chat application wrapper system 240 (shown in greater detail in FIG. 4) which provides an extension to the existing chat product such that the chat application can be remotely run in separate machines and networks. In embodiments of the invention, external users can access the internal chat resource even when the chat resource is located inside necessary firewalls 215. This architecture enables the enterprise to provide chat services to external customers based on a paid model.

Figure 3:
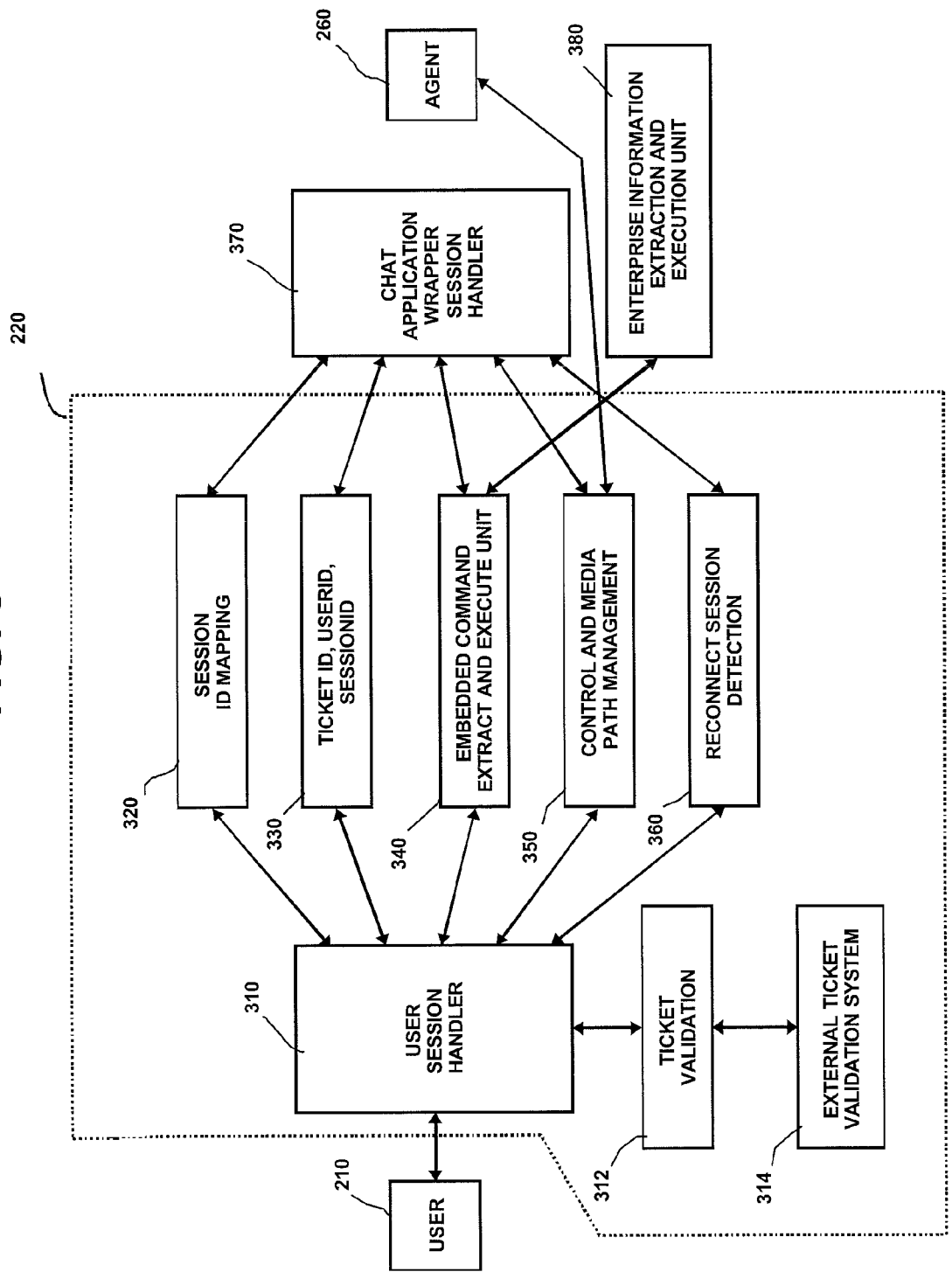
FIG. 3 is a block diagram depicting a chat proxy system configured in accordance with the invention.
Figure 4:
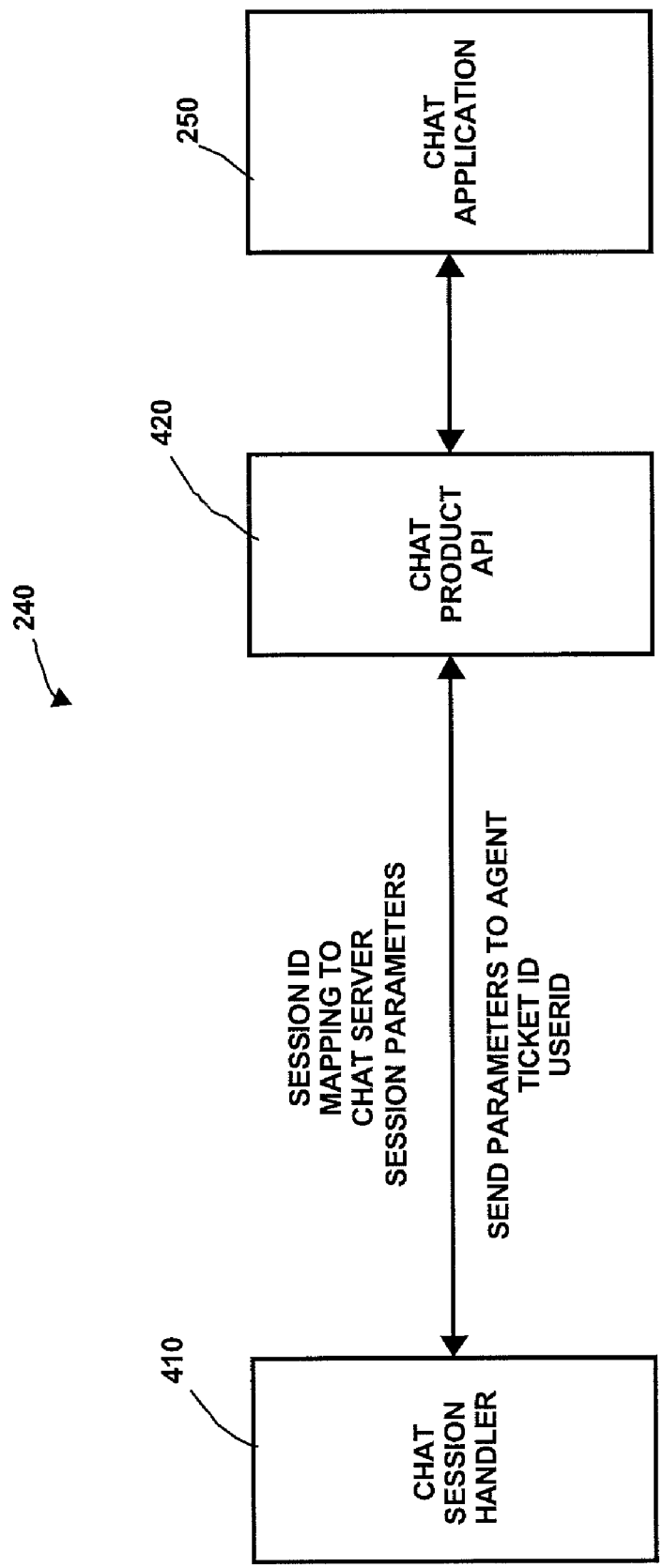
FIG. 4 is a block diagram depicting a chat wrapper configured in accordance with the invention.

The chat application proxy system 220 as depicted in FIG. 3 is configured to perform certain operations and further comprises subunits that perform further operations. A user 210 requests a chat session through user session handler 310. In one possible embodiment the user logs into a separate portal to create a ticket. The portal can be a corporate portal or a service provider portal. The user cooperates with the system to perform user validation. Within the portal there is a "chat button or link" that a user clicks to redirect the chat request to the user session handling block 310 of chat application proxy system 220. In the request sent to the user session handling block 310 of the chat application proxy system 220, parameters such as a ticket identifier ("ticket ID") of the user chat session request and the URL need to validate the ticket ID are included. User session handler block 310 sends the ticket ID and the URL to the ticket validation block 312. The ticket validation block 312 selects the request protocol and ID and password required for the URL and sends the ticket ID to this URL (external ticket validation system 314) for validation. Once the ticket ID is validated, an internal flag will be added to the record indicating that the ticket ID has been validated. Thus there is no need for subsequent ticket ID external validation until the end of the chat session.

After the ticket ID is validated, the User Session Handler block 310 will ask the Reconnect Session Detection block 360 to see if the ticket ID already exists in the system. If the ticket ID already exists, then the session corresponds to a session that was temporarily disconnected and is now seeking to be reconnected. Such disconnection may occur when a session was previously intentionally disconnected (e.g., agent asks user to reboot the PC) or accidentally disconnected (e.g., the user accidentally closes out the chat window). If the ticket ID already exists, then the reconnected session detection block 360 will retrieve the previous HTTP session cookie created for use with the chat application 250 and return this session cookie to the User Session Handler block 310. If the User Session Handler 310 sees an existing cookie for the chat application, it will use that cookie to communicate with the chat application (via the Chat Application Wrapper Component 240). As indicated previously, the chat application proxy server 220 manages chat activities on a session basis so that existing sessions are re-used with the chat application. In the reestablished session, the user will chat with the same agent as in the prior session that was interrupted. If the Reconnect Session Detection block 360 does not find a pre-existing ticket ID, then the User Session Handler 310 will communicate with the chat application (via the Chat Application Wrapper Component 240) to create a new chat session, and the chat application will route the chat request to a selected agent.

The control and media path management block 350 in FIG. 3 maintains and manages the separation of the routing path and the media path. It will detect the control path signals (for example, agent joined, agent left, agent name, session connected and session end, etc.) from the chat application. This unit will make use of these signals to build an internal database for the entire chat system status, for example, how many chat sessions are in the system, agent names, user names, chat durations, chat start times, etc. This unit on the inbound side multiplexes the data sent from the user into control and media segments, and on the outbound side de-multiplexes control and media signals into a single signal to be transmitted back to the user. This unit also provides a chat server function in the case of multiple participants in the chat session to distribute all the media signals to all the participants in the conference.

The embedded command extraction and execution block 340 extracts embedded commands from the media traversing the media path 230. Both user and agents can issue embedded commands. Embedded command strings not only are easily identifiable from the media stream, but also need to not easily appear in a normal data stream. Preferably, long streams like "~~~ This is a command stream~~~" are used as the system embedded command stream. Once the embedded command stream is detected, the unit 340 will execute the command stream and access the Back End Enterprise Information Infrastructure accordingly.

At the end of the chat session, the entire chat transcript will automatically store in the corresponding ticket in the ticket system in FIG. 3.

Chat application wrapper component 240 (shown in FIG. 2 and shown in greater detail in FIG. 4) provides an extension to the existing chat product so that the chat application can be remotely run in separate machines and networks. The chat session handler component 410 in FIG. 4 communicates with the chat application proxy component 220 on one hand, and also communicates with the "Chat Product API" unit 420 (in FIG. 4). Chat Session Handler block 410 makes use of the Chat Product Session Cookie to tell if the incoming request is for an existing chat session or for a new chat session. If the chat Product Session cookie already exists, then it is an ongoing chat session. If not, it is a new session request. The Chat Session Handler will send the according API command to the Chat Product API unit to communicate with the chat product.

There are internal session parameters of the chat product that need to be maintained to communicate with the chat product. The Chat Session Handler unit will maintain a mapping with the Chat Proxy Application Session ID and the internal chat product parameters. This unit will use the Chat Proxy Application Session ID to communicate with the chat product on the other end. Also, this unit will send routing parameters (sent to this unit from the Chat Application Proxy) to the Chat Product for routing.

FIG. 5 is a flow chat depicting a method operating in accordance with the invention. The method starts at 510. Then, at 520, a chat application proxy component like that depicted in FIG. 3 receives a request from a user to initiate a chat session. As indicated in the preceding description of embodiments of the invention, access by users to the chat application is controlled by the chat application proxy component. Accordingly, at 530 the chat application proxy component is used to control access by the user to the chat resource. Then, before initiating a session, a chat session handler like that depicted in FIG. 3, interacts with a user validation system like that depicted in FIG. 2 to verify that the user is, in fact, a valid user. If the user is validated at decision diamond 550 to be a valid user, then a new chat session is initiated at 560. If the user is not validated at decision diamond 550 to be a valid user, then the method continues to 570 and stops.

Thus it is seen that the foregoing description has provided by way of exemplary and non-limiting examples a full and informative description of the best apparatus and methods presently contemplated by the inventors for implementing a chat system comprising a chat proxy component and a chat wrapper component. One skilled in the art will appreciate that the various embodiments described herein can be practiced individually; in combination with one or more other embodiments described herein; or in combination with methods and apparatus differing from those described herein. Further, one skilled in the art will appreciate that the present invention can be practiced by other than the described embodiments; that these described embodiments are presented for the purposes of illustration and not of limitation; and that the present invention is therefore limited only by the claims which follow.

We claim:

1. A system comprising:
   at least one computer-readable memory medium tangibly embodying a computer program; and
   at least one digital processing apparatus which in response to execution of the computer program is configured to implement at least the following:
   a chat application proxy component configured to control access by users to a chat application providing access to help desk services using a plurality of agents, the chat application proxy component configured to implement, as part of the chat application proxy component, a user-facing chat application that provides a graphical user interface to the users, wherein the users interact with the user-facing chat application and the plurality of agents interact with the chat application, the chat application proxy component further configured to route, based on a ticket identification, a chat request from a given user for a new chat session to a selected one of the agents if no previously existing chat session existed between the given user and the selected agent and to reestablish, based on the ticket identification, a previously existing chat session between the given user and the selected agent by routing the request for the new chat session to the selected agent, wherein the ticket identification corresponds to a ticket previously created for help desk services and configured to store at least a chat transcript between the given user and the selected agent; and
   a chat application wrapper component configured to manage communication between the chat application proxy component and the chat application, wherein the chat application is external to both the chat application proxy component and the chat application wrapper component, and wherein the chat application wrapper component manages communication at least by maintaining a mapping between a session identification used by the chat application proxy component and chat application parameters and by using the session identification to communicate with the chat application,
   wherein the chat application proxy component is further configured to implement a routing path through the chat application wrapper component and the chat application, to route chat communications between users and agents through the routing path, to implement a media path outside the routing path and between the chat application proxy component and at least one of the plurality of agents, to route multimedia over the media path and between a user and the at least one chat agent.

2. The system of claim 1 wherein the chat application proxy component is further configured to control access to the chat application on a session-specific basis, the session corresponding at least in part to ticket identifications.

3. The system of claim 1 wherein the chat application proxy component further comprises a chat session handler configured to receive the request from the given user for the new chat session; to initiate the new chat session in response to the request; and to direct chat communications occurring during the new chat session.

4. The system of claim 3 wherein the at least one digital processing apparatus in response to execution of the computer program is further configured to implement at least the following: a user validation component configured to receive the ticket identification for the given user and a uniform resource locator and to send the ticket identification to an address corresponding to the uniform resource locator to validate the ticket identification.

5. The system of claim 4 wherein the chat session handler is further configured to initiate the new session in response to the user request for the new chat session only if the given user is validated as a valid user by the user validation component.

6. The system of claim 4 wherein the user validation component further comprises a user payment component configured to receive payment for the chat session requested by the given user; and to validate the user as a valid user only if valid payment is received.

7. The system of claim 1 wherein the chat application proxy component is further configured to re-use a routing path implemented by the chat application to perform chat session control operations.

8. The system of claim 1 wherein the chat application natively supports a language, and wherein the media path supports at least one other language in addition to the language natively supported by the chat application.

9. The system of claim 8 where the at least one other language is encoded using Unicode.

10. The system of claim 1 wherein the chat application proxy component is further configured to extract embedded commands from the media path and to execute the embedded commands.

11. The system of claim 10 wherein at least one of the embedded commands allows the selected agent to assume control of the given user's computer during a chat session.

12. The system of claim 1 wherein the user-facing chat application is further configured to convert an input language into Unicode.

13. The system of claim 1 wherein the system further comprises an agent-facing chat application configured to be implemented on a machine of the agent.

14. The system of claim 13 wherein agent-facing chat application is further configured to transmit and to receive commands over the media path.

15. The system of claim 13 wherein the agent-facing chat application is further configured to convert an input language into Unicode.

16. The system of claim 1 wherein the system is further configured to save the chat transcript in the ticket.

17. The system of claim 1, wherein the at least one digital processing apparatus in response to execution of the computer program is further configured to implement at least the following:
- a first firewall between the user and the chat application proxy;
- a second firewall between the chat application proxy component and the chat application wrapper component; and
- a third firewall between the chat application and one or more agents using the chat application.

18. A computer program product comprising a non-transitory computer-readable memory medium tangibly embodying a computer program, the computer program, when executed by digital processing apparatus, configured to establish a chat application proxy component to perform operations to control access by users to a chat application providing access to help desk services using a plurality of agents, the chat application proxy component and to perform operations to implement, as part of the chat application proxy component, a user-facing chat application that provides a graphical user interface to the users, wherein the users interact with the user-facing chat application and the plurality of agents interact with the chat application, the chat application proxy component further configured to route, based on a ticket identification, a chat request from a given user for a new chat session to a selected one of the agents if no previously existing chat session existed between the given user and the selected agent and to reestablish, based on the ticket identification, a previously existing chat session between the given user and the selected agent by routing the request for the new chat session to the selected agent, wherein the ticket identification corresponds to a ticket previously created for help desk services and configured to store at least a chat transcript between the given user and the selected agent, the computer further configured to establish a chat application wrapper component to perform operations to manage communication between the chat application proxy component and the chat application, wherein the chat application is external to both the chat application proxy component and the chat application wrapper component, and wherein the chat application wrapper component manages communication at least by maintaining a mapping between a session identification used by the chat application proxy component and chat application parameters and by using the session identification to communicate with the chat application, wherein the chat application proxy component is further configured to implement a routing path through the chat application wrapper component and the chat application, to route chat communications between users and agents through the routing path, to implement a media path outside the routing path and between the chat application proxy component and at least one of the plurality of agents, to route multimedia over the media path and between a user and the at least one chat agent.

* * * * *